US011122502B2

United States Patent
Han (10) Patent No.: US 11,122,502 B2
(45) Date of Patent: Sep. 14, 2021

(54) ACCESS POINT FIT (71) Applicant: Hewlett Packard Enterprise Development LP, Houston, TX (US)

(72) Inventor: Jianpo Han, Beijing (CN)

(73) Assignee: Aruba Networks, Inc., Sunnyvale, CA (US)

( * ) Notice: Subject to any disclaimer, the term of this patent is extended or adjusted under 35 U.S.C. 154(b) by 133 days.

(21) Appl. No.: 16/487,131

(22) PCT Filed: Mar. 7, 2017

(86) PCT No.: PCT/CN2017/075840
§ 371 (c)(1),
(2) Date: Aug. 20, 2019

(87) PCT Pub. No.: WO2018/161242
PCT Pub. Date: Sep. 13, 2018

(65) Prior Publication Data
US 2021/0136678 A1 May 6, 2021

(51) Int. Cl.
*H04W 48/20* (2009.01)
*H04L 12/26* (2006.01)
(Continued)

(52) U.S. Cl.
CPC ............ *H04W 48/20* (2013.01); *H04L 43/12* (2013.01); *H04L 43/16* (2013.01); *H04W 24/08* (2013.01); *H04W 48/14* (2013.01); *H04W 88/08* (2013.01)

(58) Field of Classification Search
None
See application file for complete search history.

(56) References Cited

U.S. PATENT DOCUMENTS 7,907,562 B2   3/2011  Murty et al.
8,179,862 B2 *  5/2012  Kelly ............... H04W 16/14
                                                      370/332
(Continued)

FOREIGN PATENT DOCUMENTS

CN    10534540       9/2009
CN    102802232      11/2012
(Continued)

OTHER PUBLICATIONS

International Searching Authority, The International Search Report and the Written Opinion, dated Dec. 1, 2017, PCT/CN2017/075840, 11 Pgs.
(Continued)

*Primary Examiner* — Hong S Cho
(74) *Attorney, Agent, or Firm* — Brooks, Cameron & Huebsch, PLLC (57) ABSTRACT

Example systems relate to access point fit. A system may include a processing resource and a memory resource. The memory resource may store machine readable instructions to cause the processing resource to determine a fit for a first client device using a plurality of metrics in response to a scan request from the first client device. The memory resource may further include instructions to cause the processing resource to determine that the fit for the first client device is above a threshold fit. The memory resource may further include instructions to cause the proceeding resource to respond to the scan request from the first client device with a probe response in response to the determination that the fit for the first client device is above the threshold fit.

10 Claims, 4 Drawing Sheets

(51) Int. Cl.
*H04W 24/08* (2009.01)
*H04W 88/08* (2009.01)
*H04W 48/14* (2009.01)

(56) References Cited

U.S. PATENT DOCUMENTS

| | | |
|---|---|---|
| 8,989,147 B1 | 3/2015 | Mater et al. |
| 9,338,740 B2 | 5/2016 | Katherine et al. |
| 9,363,747 B2 | 6/2016 | Geller |
| 2008/0080388 A1* | 4/2008 | Dean .................... H04W 92/20 370/252 |
| 2012/0287783 A1 | 11/2012 | Kuhn et al. |
| 2014/0293790 A1 | 10/2014 | Xiao et al. |
| 2016/0309537 A1 | 10/2016 | Hart et al. |
| 2016/0353320 A1* | 12/2016 | Hongo .............. H04W 28/0289 |

FOREIGN PATENT DOCUMENTS

| | | |
|---|---|---|
| CN | 106385695 | 2/2017 |
| WO | 2010/097587 A1 | 9/2010 |
| WO | WO-20140155044 | 10/2014 |

OTHER PUBLICATIONS

Optimizing Aruba WLANs for Roaming Devices; Solution Guide; Aruba Networks; Jul. 2009; 90 pages.

* cited by examiner

ACCESS POINT FIT

BACKGROUND

Wireless network performance may degrade in wireless networks that include large numbers of access points. In such a network, multiple access points may attempt to facilitate a connection with a device. In some examples, this may occur through each access point sending probe responses. A device may receive the probe responses and attempt to connect with one of the access points. However, the device may have to sort through the multiple probe responses. This may take time, during which the device may not connect with an access point.

DETAILED DESCRIPTION

Wireless networks may include multiple access points to provide devices access to the network. As used herein, the term 'access point' (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices, such as client device 102, to connect to a wired network via various communications standards. An AP can include a processing resource, memory, and/or input/output interfaces, including wired network interfaces such as IEEE 802.3 Ethernet interfaces, as well as wireless network interface such as IEEE 802.11 Wi-Fi interfaces, although examples of the disclosure are not limited to such interfaces. An AP can include a memory resource, include read-write memory, and a hierarchy of persistent memory such as ROM, EPROM, and Flash memory. Access points may have the ability to receive scan requests from devices to connect to the wireless network.

When an access point receives a scan request from a device, the access point may respond with a probe response. As used herein, a probe response can, for example, refer to a frame transmitted by an access point to a client device that contains information about the access point. In a network environment containing a plurality of access points, the scanning device may receive a probe response from each of the plurality of access points. However, a portion of the plurality of access points may not be suitable to manage the device and allow the device to connect to the wireless network. For example, a portion of the plurality of access points may be managing other devices and may therefore lack the bandwidth to manage an additional device. Thus, probe responses from such access points clutter the wireless channels. Additionally, receiving a probe response from each of the plurality of access points may cause the device to have to sort through the responses to select an access point with which to connect. Sorting the responses may delay the device's ability to connect to the wireless network.

Additionally, a device may not have the ability to determine that a particular access point will provide a quality connection, e.g. a connection that will facilitate the functioning of the device, to the wireless network before connecting with the particular access point. Thus, a device can select an access point for connecting to the wireless network that provides a relatively slow or relatively low quality connection. In some examples, the access point may determine that it is not the best fit to manage the device compared to other access points of the network. In these examples, the access point can make the best fit determination after the device has connected to the wireless network via the access point. In response to determining that the access point is not a best fit for the client device, the access point may drop the device and cause the device to disconnect from the wireless network and cause an interruption in service for the device.

Access point fit, according to the present disclosure, reduces the number of access points that will respond to a scan request by preemptively determining whether a particular access point is a fit for the device sending the scan request. In some examples, access point fit may use scan-ACL policies to categorize access points and control their visibility to scanning devices. As used herein, scan-ACL policies can, for example, refer to a set of policy rules for an access point. Examples of scan-ACL policy rules include allow, or permit the access point to respond, deny, or do not permit the access point to respond, and conditional allow, or allow the access point to respond only if a certain criteria, such as location, is met. As a result, access point fit according to the present disclosure may determine that a subset of access points should be made visible to a device. This visible subset of access points may then respond to a scan request from a device. The remaining access points may be hidden from the device, meaning that they will be unable to respond to a scan request from the device. As a result, excessive scan responses are removed. Additionally, the number of scan responses can be reduced, regardless of a quantity of access points are deployed within the wireless network. This improves overall network performance by reducing channel utilization for the network.

Figure 1:
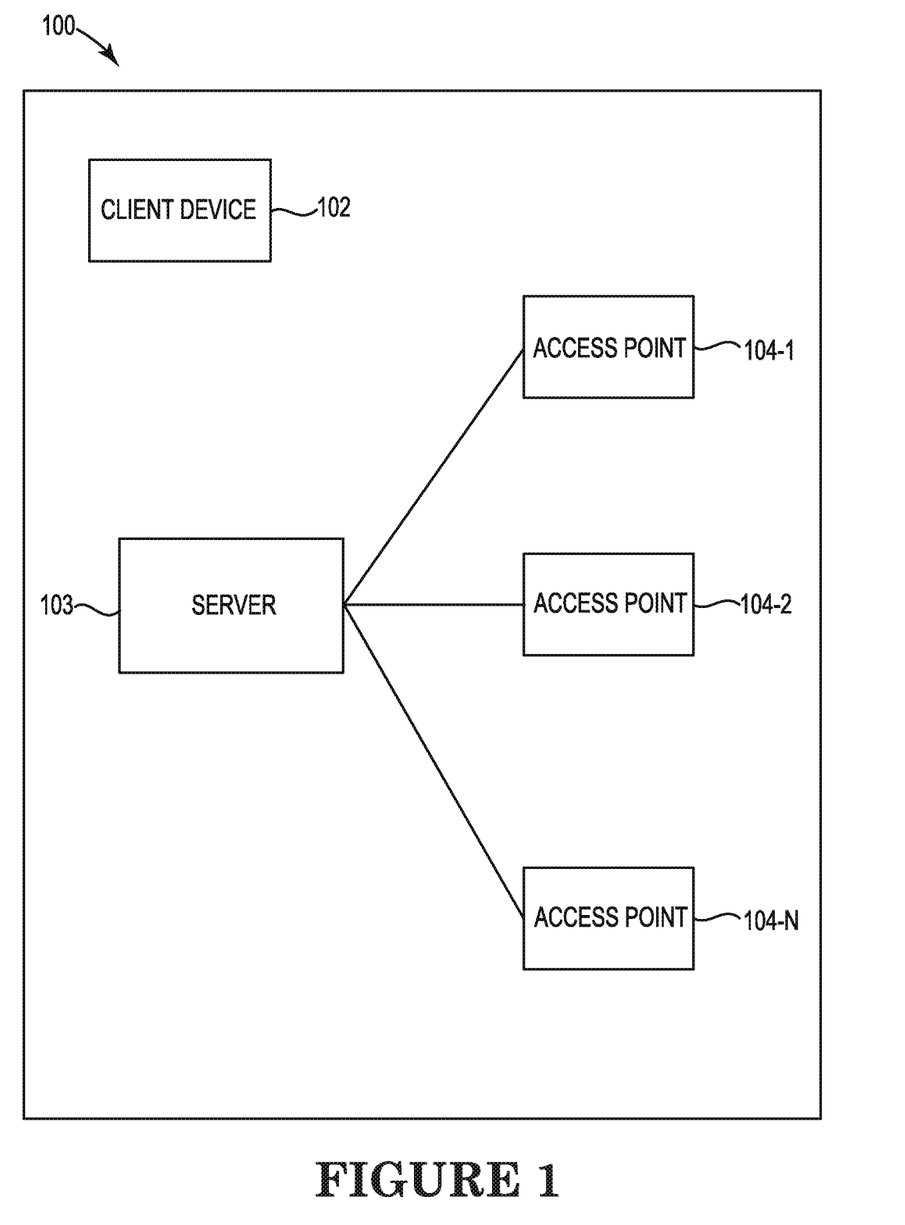
FIG. 1 is an example environment for access point fit according to the present disclosure.

FIG. 1 is an example environment 100 for access point fit according to the present disclosure. As shown in FIG. 1, environment 100 may include a client device 102. As used herein, the term client device can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Environment 100 may further include a server 103. As used herein, a server can, for example, refer to a device that provides functionality for other programs or devices. In some examples, a server may facilitate sharing of computer resources over a network. Server 103 may be communicatively coupled to access points 104-1, 104-2 . . . 104-N, further discussed herein.

Environment 100 may further include a plurality of access points 104-1, 104-2 . . . 104-N (collectively referred to herein as access points 104). The access points 104 may facilitate connection by client device 102 to a wireless network. Each of the access points 104 may be communicatively coupled to server 103. That is, access points 104 may be managed by server 103. In some examples, server 103 may execute instructions for access point fit, as described further herein.

Figure 2:
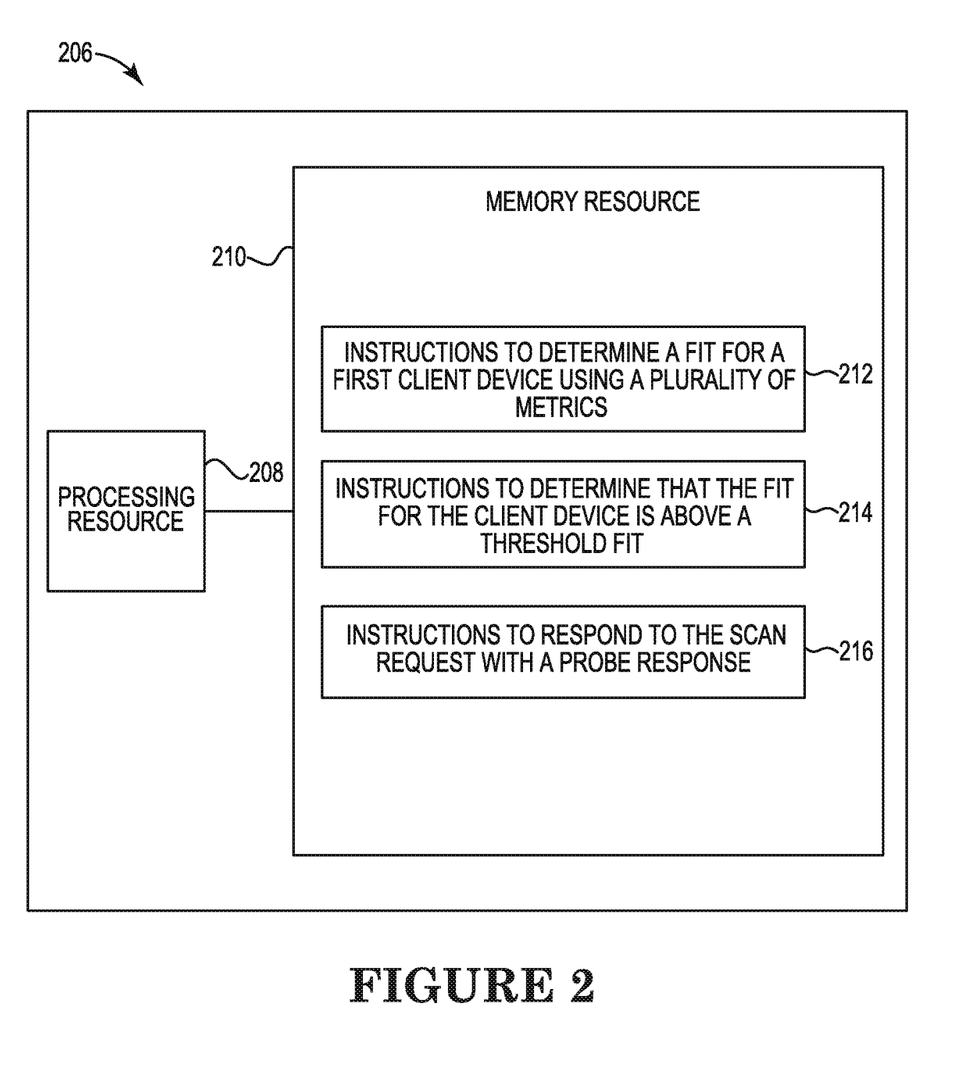
FIG. 2 is an example access point for access point fit according to the present disclosure.

FIG. 2 is an example system 206 for access point fit according to the present disclosure. System 206 may include a processing resource 208. System 206 may further include a memory resource 210 on which may be stored instructions, such as instructions 212, 214, and 216. Although the following descriptions refer to a single processor and a single memory, the descriptions may also apply to a system with multiple processors and multiple memories. In such examples, the instructions may be distributed (e.g., stored) across multiple memories and the instructions may be distributed (e.g., executed by) across multiple processors.

Processing resource 208 may be a central processing unit (CPU), a semiconductor based microprocessor, and/or other hardware devices suitable for retrieval and execution of instructions stored in memory resource 208. Processing resource 208 may fetch, decode, and execute instructions 212, 214, 216, or a combination thereof. As an alternative or in addition to retrieving and executing instructions, processing resource 208 may include at least one electronic circuit that includes electronic components for performing the functionality of instructions 212, 214, 216 or a combination thereof.

Memory resource 210 may be electronic, magnetic, optical, or other physical storage device that stores executable instructions. Thus memory resource 208 may be, for example, Random Access Memory (RAM), an Electrically-Erasable Programmable Read-Only Memory (EEPROM), a storage drive, an optical disc, and the like. Memory resource 210 may be disposed within system 206, as shown in FIG. 2. In this example, the executable instructions may be "installed" on the system 206. Additionally and/or alternatively, memory resource 210 may be a portable, external or remote storage medium, for example, that allows system 206 to download the instructions from the portable/external/remote storage medium. In this situation, the executable instructions may be part of an "installation package". As described herein, memory resource 210 may be encoded with executable instructions access point fit.

Instructions 212 may include instructions to determine a fit for a first client device using a plurality of metrics. As used herein, fit can, for example, refer to the suitability of a particular access point, such as access points 104 (shown in FIG. 1), to manage a client device. A fit of an access point may be determined using a plurality of metrics. For example, a fit may be determined using a signal strength of an access point. As used herein, signal strength can, for example, refer to a power of a transmitting antenna, such as an antenna on an access point, as received at a receiving antenna, such as an antenna on a client device. Signal strength may be measured in a variety of ways. For example, signal strength may be measured using frame rate, or a number of frames transmitted per time period, or by traffic load, or an amount of traffic being handled by a particular access point. Signal strength may further be measured by received signal strength indication (RSSI), or the amount of power received in a signal. Signal strength may also include signal-to-noise ratio (SNR), or the ratio of the strength of a signal carrying information to the level of background noise, and/or bit error rate (BER), indicating the rate at which errors occur when transmitting data. In some examples, signal strength may further include the available memory of the access point, or how much bandwidth the access point has to handle additional traffic. Examples are not so limited, however, and other signal strength metrics may be used.

In some examples, instructions 212 may include instructions to consider location-based metrics of the access point. As used herein, location-based metrics can, for example, refer to those metrics that relate to the physical location of the access point. For example, location-based metrics may include the proximity of the access point to the client device seeking to connect to the network. Location-based metrics may further include the location of the access point within the network environment. Examples are not so limited, however, and other location-based metric may be used.

In some examples, instructions 212 may include instructions to consider both signal strength and location-based metrics when determining a fit for the first client device. For example, instructions 212 may include instructions to determine a signal strength of an access point and a location of the access point. Instructions 212 may include instructions to determine a fit for the access point based on the determined signal strength and the determined location.

Instructions 214 may include instructions to determine that the fit for the first client device is above a threshold fit. In some examples, the fit for the first client device may be the fit determined by instructions 212. Instructions 214 may include instructions to determine that the fit for the first client device is above a threshold fit based on the plurality of metrics. For example, instructions 214 may include instructions to determine that fit based on signal strength is above a threshold fit based on signal strength. In some examples, a fit based on signal strength may be above a threshold fit when the determined signal strength is above a threshold signal strength.

Instructions 214 may further include instructions to determine that the fit based on location is above a threshold fit. For example, the access point may be a fit for the client device based on its location in relation to the client device. Instructions 214 may include instructions to determine that the fit based on the location of the access point relative to the client device is above a threshold fit based on location. However, examples are not so limited and other fit of a location-based metric may be determined to be above a threefold fit.

In some examples, instructions 214 may include instructions to determine that the fit for the first client device is above a threshold fit based on the plurality of metrics. For example, instructions 214 may include instructions to determine that each of the plurality of metrics is above its respective threshold. Instructions 214 may then include instructions to combine the plurality of determinations to make a final determination that the fit for the client device is above an overall threshold fit. For example, instructions 214 may include instructions to determine that the signal strength is above a threshold signal strength and the location-based metrics are above their threshold locations. Instructions 214 may then include instructions to combine each determination to determine that an overall fit is above a threshold fit. For example, instructions 214 may determine that a signal strength is above a threshold signal strength and a location of the access point with respect to the client device is above a threshold location. Instructions 214 may determine that a threshold number of metrics are above their thresholds, for example, a threshold of two metrics being above their respective thresholds. Instructions 214 may then compare the determination of the individual metrics to the overall threshold to determine an overall fit for the access point. For example, an access point with a signal strength above a threshold signal strength and a location of the access point above the threshold location may be determined to meet overall threshold of two metrics above their respective thresholds, and thus be determined to have a fit above a threshold fit. By contrast, an access point with a signal strength above a threshold signal strength and a location below the threshold location may be determined to be below the overall threshold of two metrics above their respective thresholds and thus be determined to have a fit below the threshold fit.

Instructions 216 may include instructions to respond to the scan request with a probe response. As used herein, a probe response can, for example, refer to a frame transmitted by an access point to a client device that contains information about the access point. For example, a probe response may contain the access point's service set identifier (SSID). In some examples, a probe response may include information to allow the client device to connect to the access point.

In some examples, instructions 216 may include instructions to respond to the scan request in response to the determination that the fit for the first client device is above the threshold fit. That is, instructions 216 may include instructions to respond to the scan request with a probe response if the fit for the first client device is above the threshold fit. In some examples, the determination that the fit for the first client device is above the threshold fit may be made by instructions 214.

Memory resource 208 may further include instructions to refrain from responding to the scan request when the fit for the first client device is below the threshold fit. That is, memory resource 208 may include instructions to refrain from allowing an access point, such as access points 104 (shown in FIG. 1) to transmit a probe response if the fit determined by instructions 214 is below the threshold fit. In such examples, although the access point may receive a scan request, the access point may refrain from transmitting a probe response frame in response to the scan request.

Memory resource 208 may further include instructions to determine a second access point with a fit for the first client device that is above the threshold fit. The second access point may be different than the first access point. In some examples, determination of the second access point may occur in response to the determination that the fit for the first client device of the first access point is below the threshold fit. Memory resource 208 may include instructions to select the second access point to respond to the scan request. The instructions to select the second access point to respond to the scan request may include instructions to select the second access point in response to the determination that the second access point has a fit for the first client device that is above the threshold fit. Memory resource 208 may include instructions to instruct the second access point to transmit a probe response. In some examples, the probe response transmitted by the second access point may be in response to the first scan request from the first client device.

Memory resource 208 may further include instructions to determine a fit for a second client device using a plurality of metrics in response to an access point receiving a scan request from the second client device. The instructions to determine a fit for the second client device may be similar to instructions 212. Memory resource 208 may further include instructions to determine that the fit for the second client device is below the threshold fit. In response to the determination that the fit for the second client device is below the threshold fit, memory resource 208 may include instructions to cause an access point to refrain from responding to the second scan request.

Memory resource 208 may further include instructions to update the threshold fit in response to a determination that an amount of time has passed. In some examples, updating the threshold fit may include determining that a status of an access point has changed. For example, an access point may have a changed signal strength. Therefore, updating the threshold fit may include accounting for the change in signal strength. Updating the threshold fit may also include accounting for changes in location-based metrics, e.g. a client device moving closer to or further from an access point. In some examples, the threshold fit may be updated in response to a determination that a fixed amount of time has passed. For example, the threshold fit may be updated every five minutes.

Figure 3:
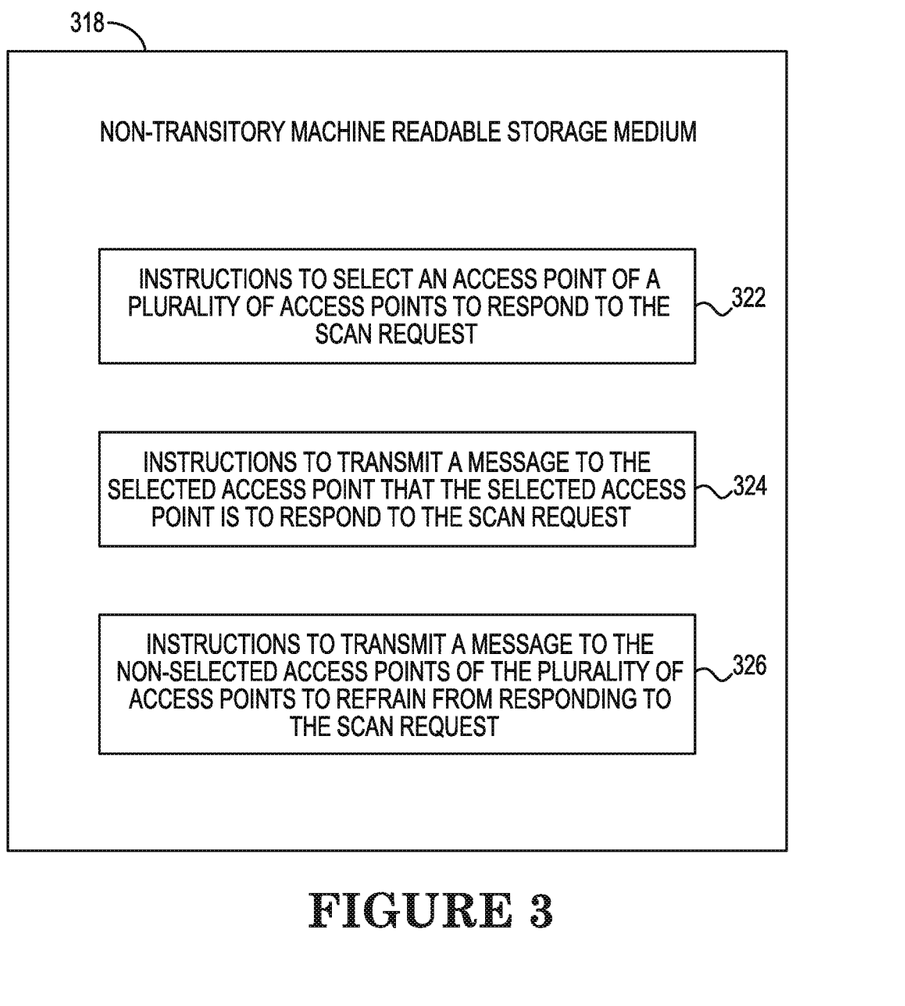
FIG. 3 is an example medium for access point fit according to the present disclosure.

FIG. 3 is an example medium 318 for access point fit according to the present disclosure. Medium 318 may be the same as or similar to memory resource 210, as described in FIG. 2, and may store instructions 322, 324, 326, or a combination thereof.

Instructions 322 may include instructions to select an access point of a plurality of access points to respond to the scan request. In some examples, instructions 322 may include instructions to determine a signal strength of each access point of the plurality of access points. As discussed with respect to FIG. 2, signal strength may refer to a power of a transmitting antenna, such as an antenna on an access point, as received at a receiving antenna, such as an antenna on a client device, and may include such measures as RSSI, BER, and/or SNR. However, examples are not so limited and other measure of signal strength may be used. An individual signal strength may be measured for each access point of the plurality of access points. In some examples, a greater signal strength value may indicate a high overall performance by the access point, while a lower signal strength value may indicate a low overall performance by the access point.

Instructions 322 may further include instructions to determine a location of each access point of the plurality of access points. As described with respect to FIG. 2, determining a location of an access point may include determining a physical location of an access point within a network environment, such as environment 100 (shown in FIG. 1). Determining a location of an access point may further include determining a location of an access point with respect to a particular client device. In some examples, a location of each access point of the plurality of access points may be determined.

In some examples, instructions 322 may include instructions to select an access point of the plurality of access points based on the signal strength of the access point, the location of the access point, or a combination thereof. For example, instructions 322 may include instructions to select an access point of the plurality of access points with the greatest signal strength. Said differently, instructions 322 may include instructions to select an access point of the plurality of access points that will be able to provide an overall best management for the particular type of client device based on the characteristics of the particular access point.

Instructions 324 may include instructions to transmit a message to the selected access point that the selected access point is to respond to the scan request. In some examples, the selected access point may be the access point selected at 322. In some examples, instructions 324 may include instructions to respond to the scan request using a broadcast beacon. As used herein, a broadcast beacon can, for example, refer to a frame transmitted by an access point containing information about the network with which the access point is associated. For example, a broadcast beacon may include an SSID of the access point, information regarding the type of network, and/or the parameters associated with the network. In some examples, a broadcast beacon may include information to allow the receiving client device to scan to the particular access point that transmitted the broadcast beacon, thus allowing the client device to connect to the network. Instructions 324 may include instructions to include the SSID of the selected access point in the broadcast beacon transmitted by the selected access point. Inclusion of the SSID of the selected access point in the broadcast beacon may allow the client device to scan to and connect to the network using the selected access point.

Instructions 326 may include instructions to transmit a message to the non-selected access points of the plurality of access points to refrain from responding from the scan request. In some examples, instructions 326 may include instructions to transmit a message to the non-selected access point to transmit a broadcast beacon that hides the SSID of the non-selected access points. That is, instructions 326 may include instructions to the non-selected access points to transmit an incomplete broadcast beacon. As used herein, an incomplete broadcast beacon can, for example, refer to a broadcast beacon that does not include an SSID. When a non-selected access point transmits a broadcast beacon that hides its SSID, the non-selected access point has not provided a broadcast beacon that contains information for the client device to be able to connect to the access point. Thus, while the client device may receive the broadcast beacon, the client device will not connect to the non-selected access point. Said differently, the non-selected access point will hide its ability to provide a connection with the client device as a result of its transmission of the incomplete broadcast beacon.

Medium 318 may further include instructions to receive a scan request from a second client device. In some examples, the second client device may be different than the first client device. Medium 318 may include instructions to select a second access point of the plurality of access points to respond to the scan request from the second client device. In some examples, the second selected access point may be different than the first selected access point. In some examples, the second access point may be selected based on channel quality, load, and/or type of client device, as discussed with respect to 322. The second access point may then respond to the scan request of the client device using a broadcast beacon. In some examples, the broadcast beacon may include the SSID of the second client device, and may thus facilitate connection to the network by the second client device.

Figure 4:
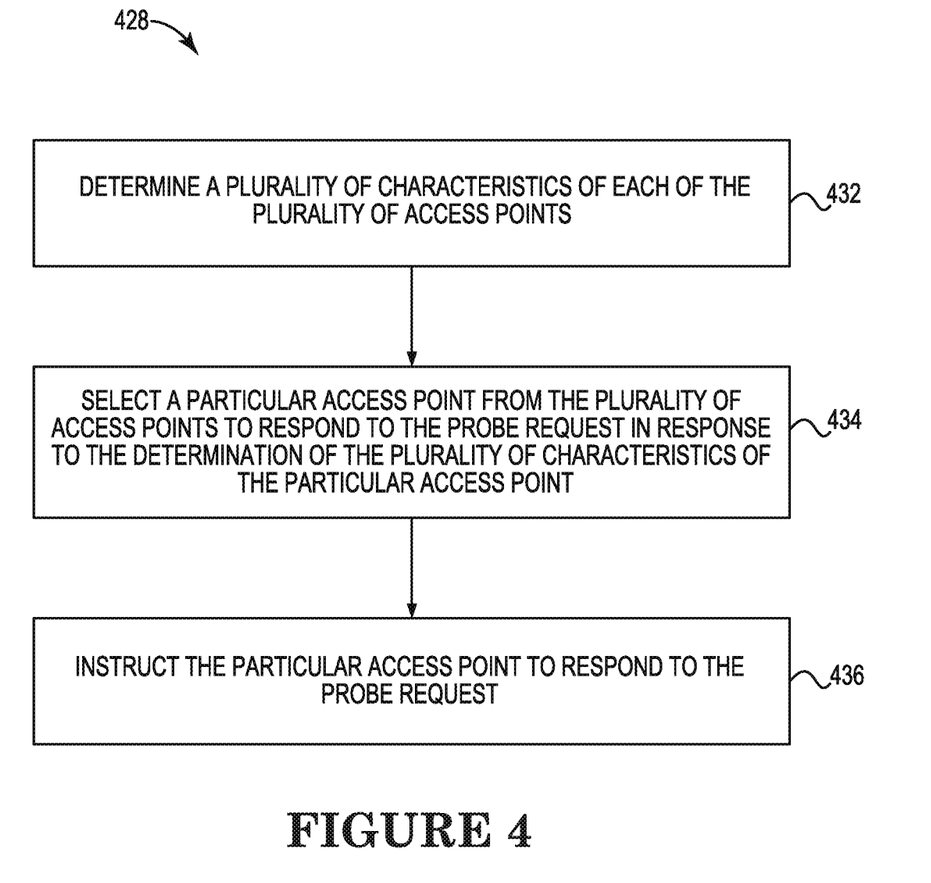
FIG. 4 is an example method for access point fit according to the present disclosure.

FIG. 4 is an example method 428 for access point fit according to the present disclosure. Method 428 may be performed by a computing device such as an access point, although examples are not so limited. At 432, method 428 may include determining a plurality of characteristics of each of the plurality of access points. In some examples, determining a plurality of characteristics may include determining a signal strength for each of the plurality of access points. In some examples, determining a plurality of characteristics may include determining a location of each of the plurality of access points.

At 434, method 428 may include selecting a particular access point from the plurality of access points to respond to the probe request. In some examples, selecting the particular access point from the plurality of access points at 434 may occur in response to the determination of the plurality of characteristics of the particular access point at 432. For example, an access point selected at 434 may be selected due to signal strength, its location, or a combination thereof.

At 436, method 428 may include instructing the particular access point to respond to the probe request. Instructing the particular access point to respond to the probe request at 436 may include instructing the particular access to transmit a probe response. As discussed with respect to FIG. 2, a probe response may contain information about the access point transmitting the probe response. In some examples, instructing the particular access point to respond to the probe request at 436 may include instructing the selected access point to transmit a broadcast beacon. The broadcast beacon may contain identifying information for the particular access point, such as the particular access point's SSID.

Method 428 may further include deselecting a plurality of access points. The deselected access points may be those access points not selected as the particular access point at 434. Said differently, the deselected access points may include those access points not selected to respond to the probe request. Method 428 may include instructing the deselected access points to refrain from responding to the probe request. Instructing the deselected access points to refrain from responding to the probe request may include instructing the deselected access points to refrain from transmitting a probe response. Said differently, instructing the deselected access points to refrain from responding to the probe request may include instructing the deselected access points to refrain from transmitting frames including network information.

Instructing the deselected access points to refrain from responding to the probe request may further include instructing the deselected access points to transmit a broadcast beacon. In some examples, the broadcast beacon may include a hidden SSID for each of the plurality of deselected access points. That is, as discussed with respect to FIG. 3, the broadcast beacon may be incomplete. As a result, while the deselected access points may transmit broadcast beacons, the client device will not receive enough information to allow the client device to connect to the network using one of the deselected access points.

Method 428 may further include updating the threshold values of the plurality of characteristics in response to a determination that a particular amount of time has elapsed. As discussed with respect to FIG. 2, updating the threshold values of the plurality of characteristics may include updating the threshold values for signal strength and/or location. In some examples, the threshold value may be updated at regular intervals, e.g., every five minutes. However, examples are not so limited and the threshold may be updated at other intervals. In some examples, the threshold values may be updated for each access point of the plurality of access points.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A system, comprising:
a processing resource; and
a memory resource storing machine readable instructions to cause the processing resource to:
 determine a fit for a first client device using a plurality of metrics in response to a scan request from the first client device;
 determine that the fit for the first client device is above a threshold fit; and
 respond to the scan request from the first client device with a probe response in response to the determination that the fit for the first client device is above the threshold fit;
 refrain from responding to the scan request from the first client device when the fit for the first client device is below the threshold fit;
 determine a second access point with a fit for the first client device above the threshold fit;
 select the second access point to respond to the first scan request in response to the determination that the fit for the first client device is above the threshold fit; and
 instruct the second access point to transmit a probe response.

2. The system of claim 1, further comprising instructions to:
 determine a fit for a second client device in response to a scan request from the second client device; and
 refrain from responding to the scan request from the second client device when the fit for the second client device is below the threshold fit.

3. The system of claim 1, further comprising instructions to update the threshold fit in response to a determination that an amount of time has passed.

4. A non-transitory machine readable storage medium having stored thereon machine readable instructions to cause a computer processor to:
 select an access point of a plurality of access points to respond to a scan request;
 transmit a message to the selected access point that the selected access point is to respond to the scan request; and
 transmit a message to non-selected access points of the plurality of access points to refrain from responding to the scan request, and transmit a broadcast beacon that hides the SSID of the non-selected access points.

5. The non-transitory machine readable storage medium of claim 4, wherein the instructions to transmit a message to the selected access point include instructions to:
 respond to the scan request using a broadcast beacon; and
 include a service set identifier (SSID) of the selected access point in the broadcast beacon.

6. The non-transitory machine readable storage medium of claim 4, further comprising instructions to select a second access point of the plurality of access points to respond to a scan request from a second client device, wherein the second selected access point is different than the first selected access point.

7. The non-transitory machine readable storage medium of claim 4, wherein the instructions to select an access point to respond to the scan request include instructions to:
 determine a signal strength of each access point of the plurality of access points; and
 determine a location of each access point of the plurality of access points.

8. A method, comprising:
 determining a plurality of characteristics of a plurality of access points;
 selecting a particular access point from the plurality of access points to respond to a probe request from a first client device in response to a determination that the plurality of characteristics of the particular access point is above a threshold value; and
 instructing the particular access point to respond to the probe request;
 deselecting a plurality of access points; and
 instructing the deselected access points to refrain from responding to the probe request;
 instructing the deselected access points to refrain from transmitting a probe response; and
 instructing the deselected access points to transmit a broadcast beacon, wherein the broadcast beacon includes a hidden SSID for each of the deselected of access points.

9. The method of claim 8, wherein instructing the particular access point to respond to the probe request includes:
 instructing the particular access point to transmit a probe response; and
 instructing the particular access point to transmit a broadcast beacon.

10. The method of claim 8, further comprising updating the threshold values of the plurality of characteristics in response to a determination that a particular amount of time has elapsed.

* * * * *